United States Patent [19]
Shatz

[11] Patent Number: 5,870,235
[45] Date of Patent: Feb. 9, 1999

[54] ENERGY-EFFICIENT HEADLAMP

[75] Inventor: Narkis E. I. Shatz, La Jolla, Calif.

[73] Assignee: Science Applications International Corporation, San Diego, Calif.

[21] Appl. No.: 627,186

[22] Filed: Apr. 3, 1996

[51] Int. Cl.⁶ .............................. G02B 5/08; G02B 7/182; G02B 5/10

[52] U.S. Cl. .......................... 359/850; 359/851; 359/853; 359/858; 359/859; 359/857; 362/296; 362/299; 362/304

[58] Field of Search ..................................... 359/850, 851, 359/853, 858, 859, 857; 362/296, 299, 304, 346, 61

[56] References Cited

U.S. PATENT DOCUMENTS

| | | | |
|---|---|---|---|
| 1,469,690 | 10/1923 | Smith | 362/211 |
| 1,588,816 | 6/1926 | Sisson | 362/307 |
| 1,938,600 | 12/1933 | Marsat | 407/66 |
| 1,967,342 | 7/1934 | Upmeyer | 362/61 |
| 1,970,345 | 8/1934 | Speranza | 324/351 |
| 2,228,476 | 1/1941 | Murray | 362/284 |
| 2,589,569 | 3/1952 | Peter et al. | 340/815.56 |
| 2,755,374 | 7/1956 | Ott et al. | 362/247 |
| 2,981,827 | 4/1961 | Orsatti et al. | 362/84 |
| 3,536,908 | 10/1970 | Oster | 40/431 |
| 4,037,096 | 7/1977 | Brendgord et al. | 240/1.4 |
| 4,084,215 | 4/1978 | Willenbrock | 362/32 |

FOREIGN PATENT DOCUMENTS

| | | | |
|---|---|---|---|
| 0210757 | 2/1987 | European Pat. Off. | 359/864 |

*Primary Examiner*—Cassandra C. Spyrou
*Assistant Examiner*—Mohammad Y. Sikder
*Attorney, Agent, or Firm*—Pretty, Schroeder & Poplawski

[57] ABSTRACT

A reflector assembly is provided for efficiently collecting and forming the electromagnetic radiation from a radiation source into a desired beam pattern. The reflector assembly uses a smaller non-symmetrical generally convex reflector and a larger non-symmetrical generally concave reflector. The generally convex reflector intercepts a large fraction of light emitted by the source that would otherwise escape without interacting with the assembly and redirects this light onto the generally concave reflector for eventual inclusion in the beam.

19 Claims, 6 Drawing Sheets

ENERGY-EFFICIENT HEADLAMP

BACKGROUND OF THE INVENTION

This invention relates generally to energy-efficient projectors of electromagnetic radiation which collect energy emitted from a source and, more particularly, to shallow reflector assemblies that efficiently collect light emitted from a light source and project it into a predetermined beam pattern.

A parabolic reflector is often used to collect light emitted by a light source and form it into an approximately collimated beam. The light source is situated approximately at the focus of the parabola and the light beam formed by the reflector exits through a circular or approximately rectangular aperture centered about the parabola's axis and travels in a direction generally along this axis. A portion of the light emerges from this system without ever intersecting the reflector and hence is called stray light. This stray light component represents an inefficiency in collecting the light from the source. For some applications, this stray light may also cause unwanted glare.

It is known that increasing the depth of the parabola can increase the collection efficiency. However, size concerns often prohibit the use of deep parabolic reflectors and the incremental efficiency gains achieved by increasing the parabola's depth diminish as the depth increases.

For example, in an automobile headlamp, the size of the optical assembly is often restricted to a relatively small volume. Because the parabolic reflector is relatively shallow, the light source is located relatively close to the reflector's exit aperture. This results in a large portion of the light emitted by the source being radiated from the exit aperture without being controlled by the reflector. In a typical headlamp, less than 40 percent of the light is collected by the reflector for projection into the beam.

Further, an automobile headlamp must meet certain glare requirements to avoid blinding oncoming drivers. Typically, a lens having generally discrete prismatic regions is located in the aperture to assist in redistributing the beam so that the resulting pattern achieves a certain lateral spread and so that the vertical glare is also controlled. However, this lens adds to the cost and complexity of the headlamp's optical design.

Accordingly, there is a need for a shallow optical assembly that efficiently collects the light from a source and forms it into a desired beam pattern. The present invention satisfies this needs.

SUMMARY OF THE INVENTION

The present invention is embodied in a reflector assembly that efficiently collects light emitted by a light source and projects that light into a predetermined beam pattern. The reflector assembly uses a smaller non-symmetrical generally convex reflector and a larger non-symmetrical generally concave reflector. The shapes of the two reflectors are derived using nonimaging optical techniques to achieve the desired beam pattern.

In one embodiment of the present invention, the assembly includes a reflective surface having a non-parabolic generally concave shape that defines an exit aperture and a beam projection axis. Also, this reflective surface is non-symmetric about an axis normal to its surface. The assembly also includes a reflective surface having a generally convex shape. This reflective surface intercepts at least a portion of the electromagnetic radiation emitted from the source, and reflects this portion of the radiation toward the generally concave reflective surface so that the beam's flux is increased.

In a more detailed feature of the present invention, an intersection between the generally concave reflective surface and a plane perpendicular to the beam projection axis provides a non-symmetric curve. In another more detailed feature, a curve formed by a longitudinal or lateral cross-section of the generally concave reflective surface includes at least one convex extremum. The convex extremum may be bounded by a concave extremum on each side, and the distances between the convex extremum and each concave extremum are different.

In another more detailed feature of the invention, a curve formed by a longitudinal or lateral cross-section of the generally concave reflective surface has a concave extremum bounded on each side by a convex extremum. Further, the distances between the concave extremum and each convex extremum may be different.

In another embodiment of the present invention, the assembly includes a generally concave reflective surface having a generally concave shape that defines an exit aperture and a beam projection axis, and a generally convex reflective surface having a generally convex shape that is non-symmetric about an axis normal to the surface. The generally convex reflective surface intercepts at least a portion of the electromagnetic radiation emitted from the source, and reflects this portion of the radiation toward the generally concave reflective surface so that the beam's flux is increased.

In a more detailed feature of the invention, a non-symmetric curve is formed by an intersection between the generally convex reflective surface and a plane perpendicular to the beam projection axis. Further, a curve formed by a longitudinal or lateral cross-section of the generally convex reflective surface may also have convex and concave extrema as discussed above with respect to the generally concave reflective surface.

Other features and advantages of the present invention should become apparent from the following description of the preferred embodiments, taken in conjunction with the accompanying drawings, which illustrate, by way of example, the principles of the invention.

DESCRIPTION OF THE PREFERRED EMBODIMENTS

Figure 1:
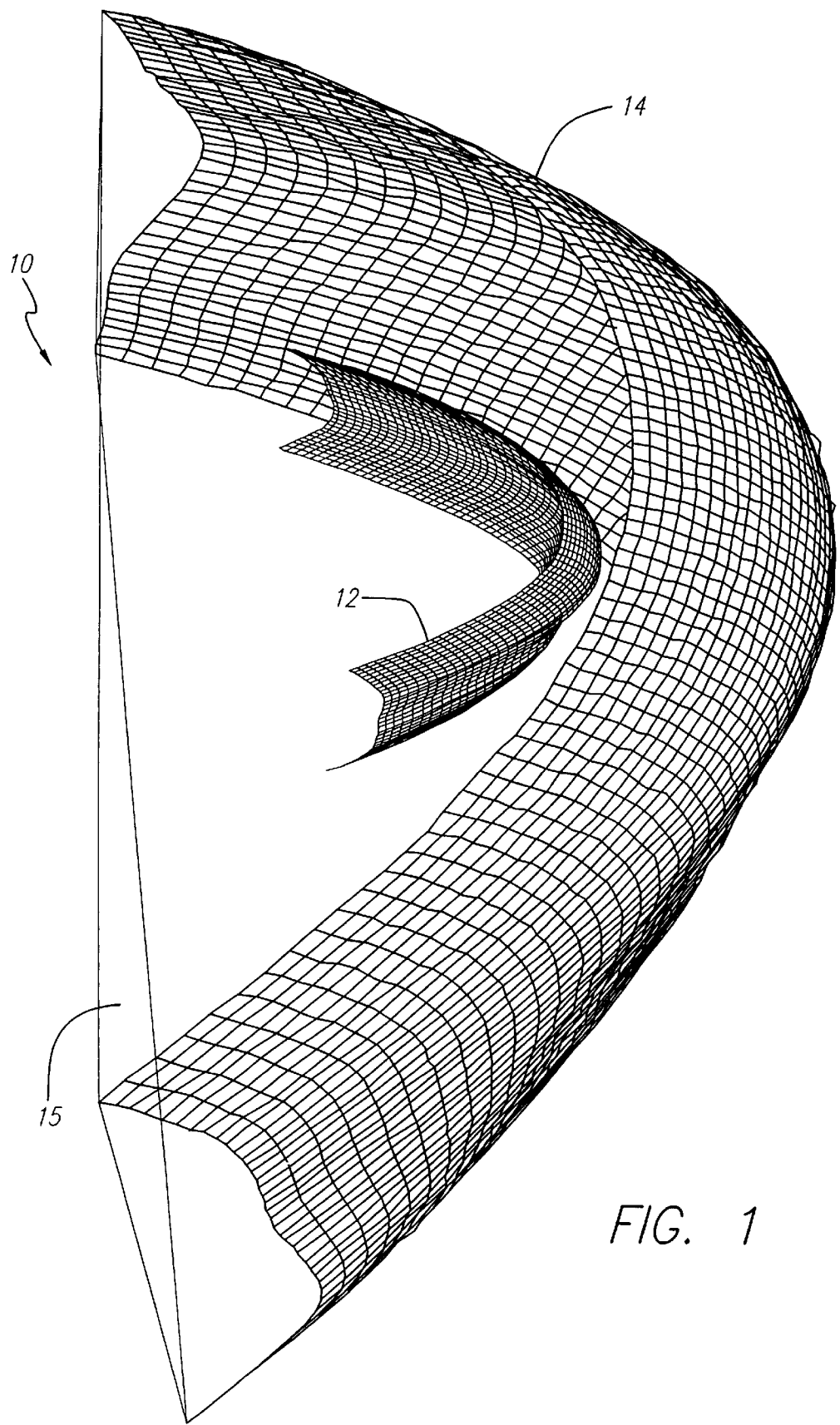
FIG. 1 is a perspective grid plot of a reflector assembly of the present invention, having a smaller generally convex reflector and a larger generally concave reflector.

As shown in the exemplary drawings, and particularly in FIG. 1, the present invention is embodied in a shallow reflector assembly 10 for providing efficient collection and projection of light from a light source into a desired beam pattern. The assembly includes two reflective surfaces 12 and 14.

The first reflective surface 12 is a generally convex surface. Among the distinguishing characteristics of the first reflective surface is that it is non-parabolic and non-symmetrical and that it may contain unique morphological features such as dimples and/or folds. This surface serves to intercept a large fraction of the light emitted by the source, that would otherwise escape without interacting with the optical system 10, and redirects this light onto the second surface 14.

Figure 2:
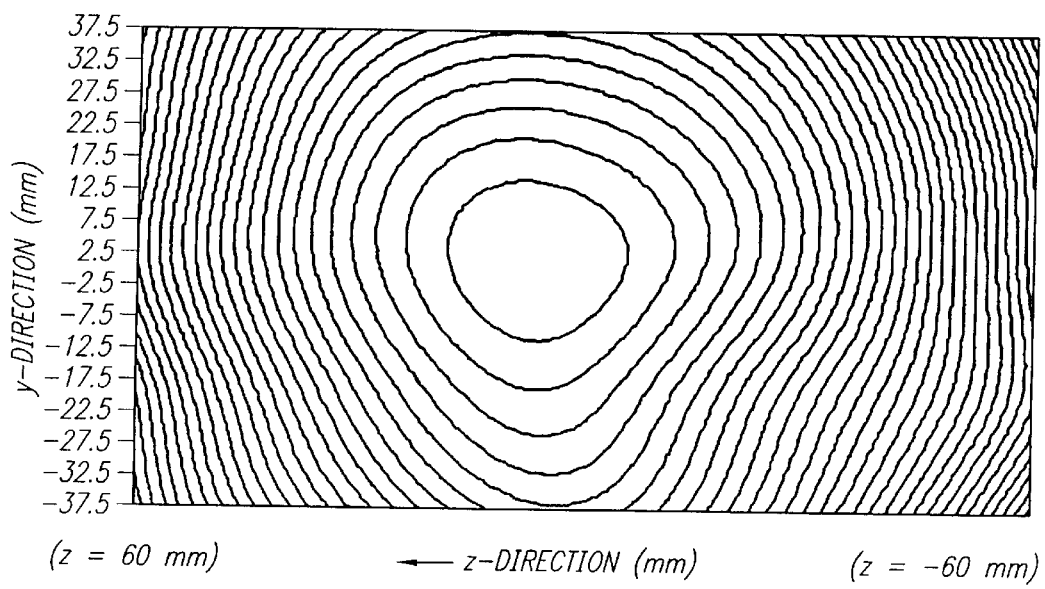
FIG. 2 is a contour plot of the surface of the generally concave reflector of FIG. 1.
Figure 3:
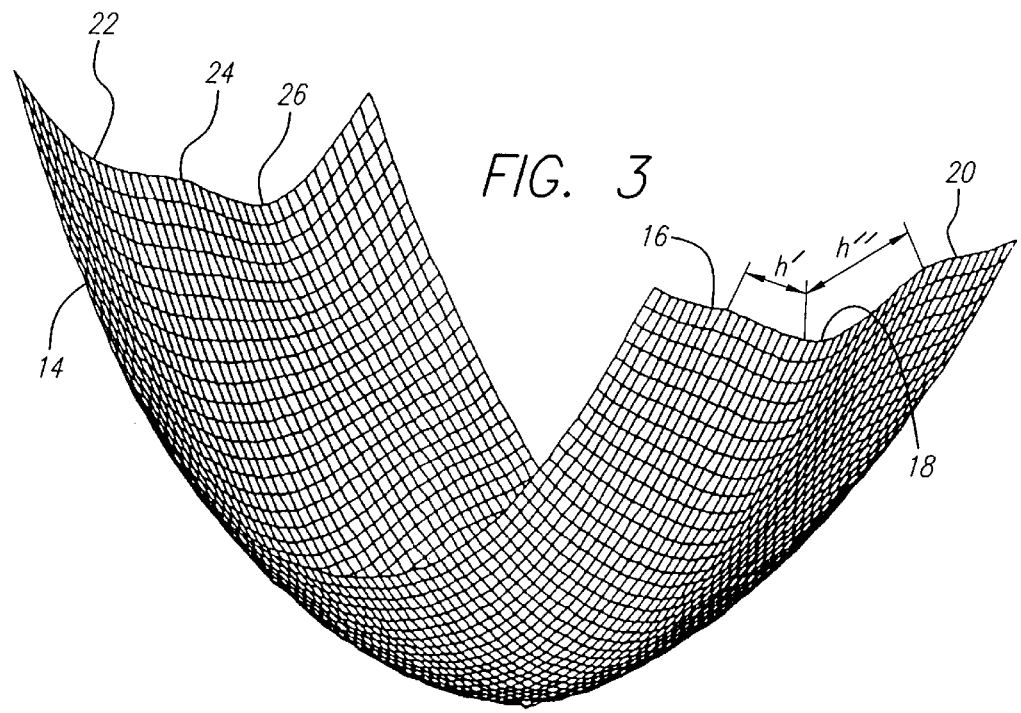
FIG. 3 is another perspective grid plot of the surface of the generally concave reflector of FIG. 1

The second reflective surface 14 is a generally concave surface that defines an aperture 15. Among the distinguishing characteristics of the second reflective surface is that it is non-parabolic and non-symmetrical, as shown in FIGS. 2 and 3. The second reflective surface may also contain unique morphological features such as dimples and folds.

Figure 4A:
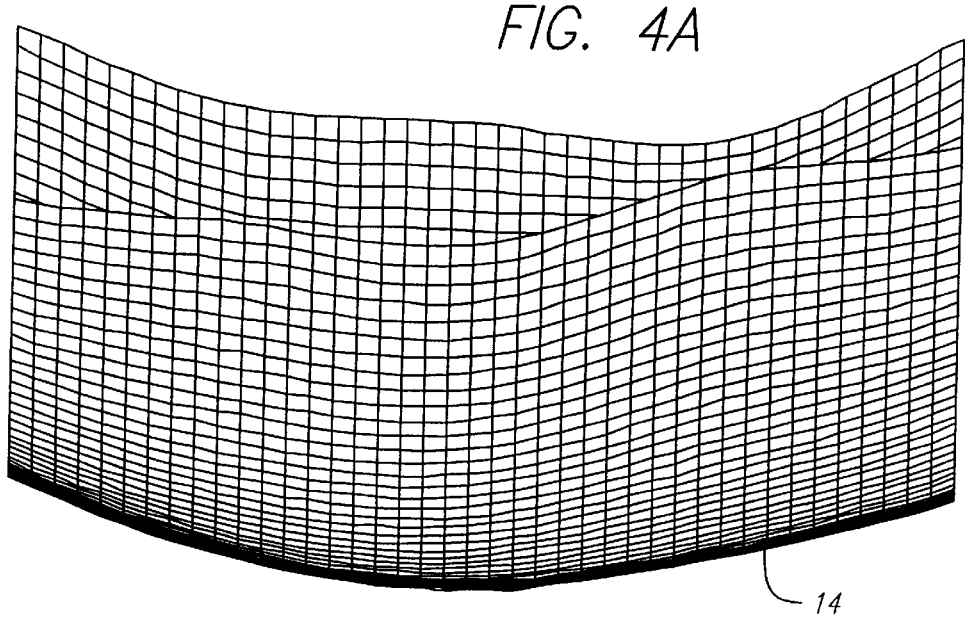
FIG. 4A is a grid plot of the surface of the generally concave reflector, viewed from the far end of the reflector as it is shown in FIG. 1
Figure 4B:
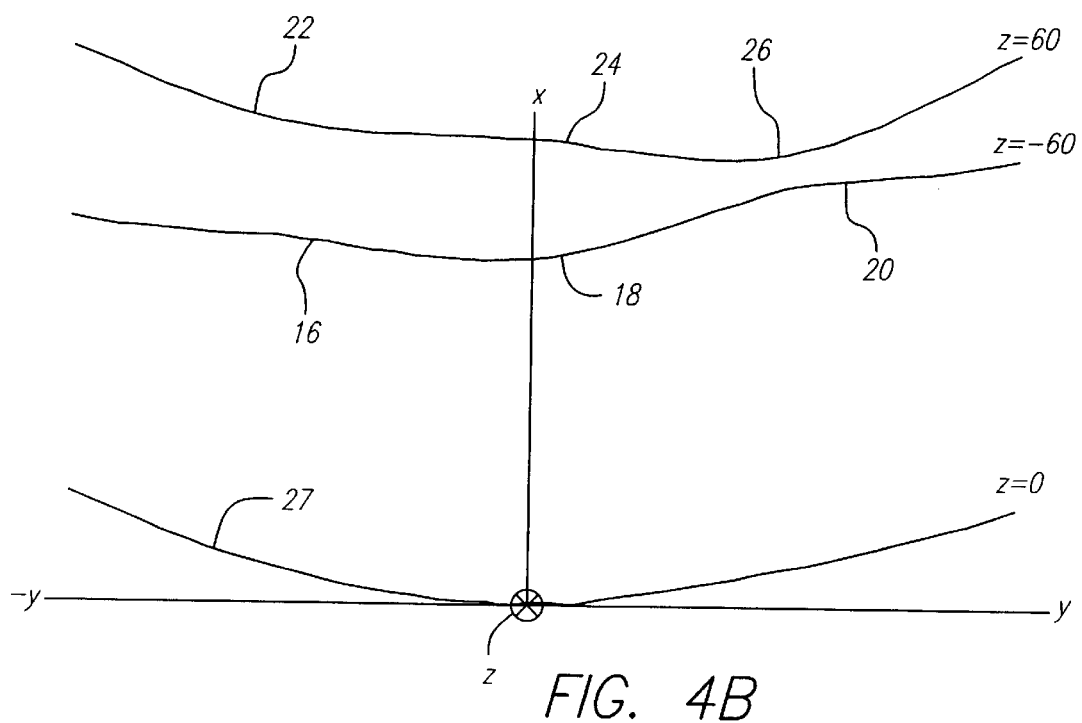
FIG. 4B is a graph showing lateral cross-sections of the generally concave reflector of FIG. 1, taken along lines at y=−37.5, 0, and +37.5 of the contour plot of FIG. 2.

Despite the generally convex geometry of the first reflective surface 12, the changes in curvature of this first surface result in localized sections of the reflective surface to occur dimples and/or folds which are locally concave. Similarly, the changes in curvature of the second reflective surface result in localized sections of the reflective surface 14 to occur dimples and/or folds which are locally convex. For example, as shown in FIG. 4A and 4B, a lateral plane, or plane parallel to the x-y plane at a fixed z value, that intersects the second reflective forms a curve having bumps or extrema corresponding to the dimples and/or folds. (As illustrated in FIG. 4B, the z-axis is normal to the plane of the diagram.) More specifically, a lateral cross-section of the second reflective surface at z=−60 results in a curve that changes from a locally convex curvature 16 to a locally concave curvature 18, and back to a locally convex curvature 20. Further, the distance h' between one convex extremum 16 and the concave extremum 18 is not necessarily equal to the distance h" between the other convex extremum 20 and the concave extremum 18. A lateral cross-section at z=60 results in a curve that exhibits an opposite behavior with its curvature changing from a locally concave curvature 22 to a locally convex curvature 24 and back to a locally concave curvature 26. At z=0, the resulting curve 27 exhibits similar features, but at a smaller scale as discussed below.

Figure 5A:
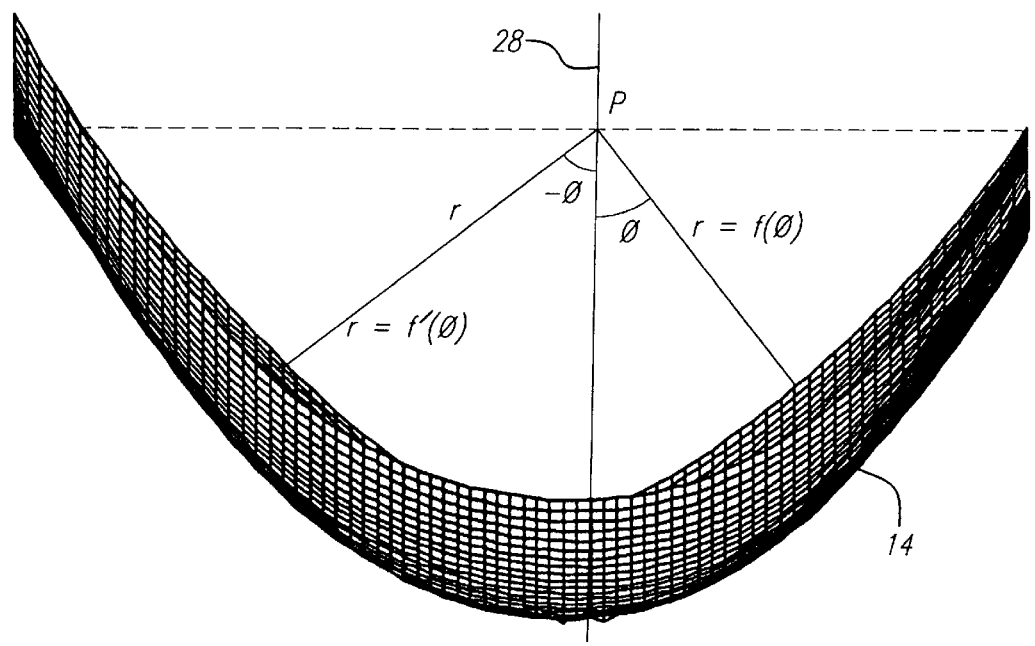
FIG. 5A is a grid plot of the surface of the generally concave reflector, viewed from the near side of the reflector as it is shown in FIG. 1
Figure 5B:
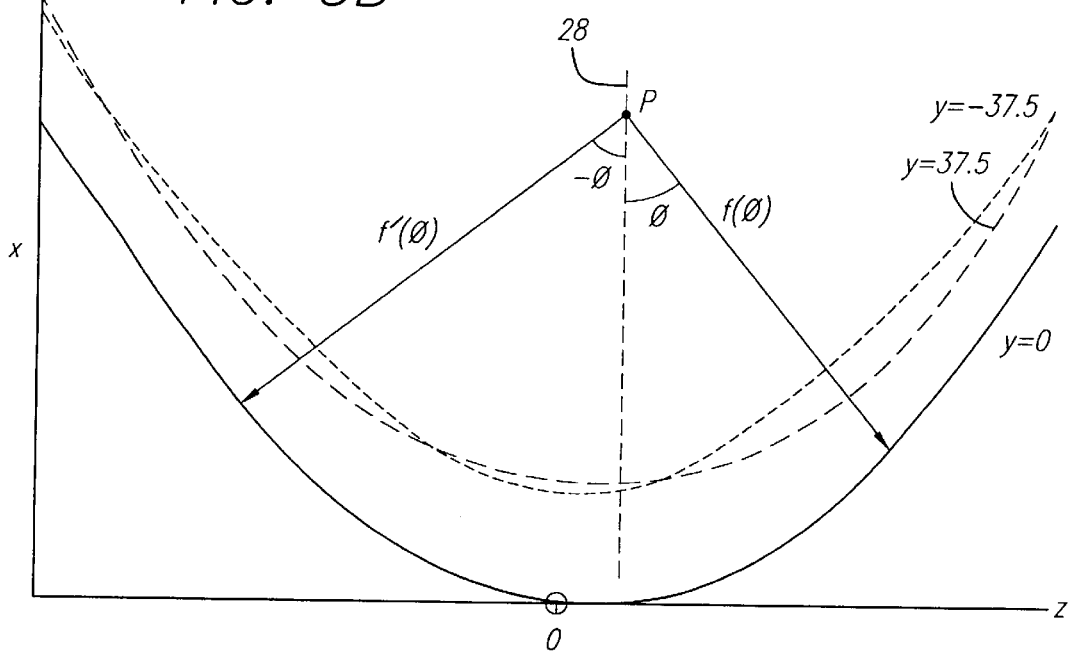
FIG. 5B is a graph showing longitudinal cross-sections of the generally concave reflector of FIG. 1, taken along lines at z=−60, 0, and +60 of the contour plot of FIG. 2.

A better understanding of the geometry of the second reflective surface 14 can be had with reference to FIGS. 5A and 5B. A longitudinal plane, or plane parallel to the x-z plane at a fixed y value, that intersects the second reflective surface likewise forms a curve having extrema. The curves shown in FIG. 5B are formed by longitudinal cross-sections of the second reflective surface at y=−37.5, 0, and +37.5. In FIG. 5B the y-axis is normal to the plane of the diagram. Along the curve formed at y=0, the second surface may be described by defining a distance r, along an axis 28, from the surface to a point P located in space a predetermined distance above the reflector. That distance r may be characterized by functions, $f(\phi)$ and $f'(-\phi)$ from the normal, which depend upon the angle $\phi$. Thus, the distance is equal to a function of the angle $\phi$ measured in the x-z plane, and as $\phi$ increases, $f(\phi)$ and $f'(-\phi)$ may increase or decrease. The functions may be non-symmetric so that $f(\phi)$ and $f'(-\phi)$ may increase at a different rate, may increase at the same rate, or one may increase while the other decreases. Accordingly, in some embodiments, $f(\phi)$ and $f'(-\phi)$ will be equal, in other embodiments, however, these functions are not equal. Typically, the changes in distance as $\phi$ increases, or $-\phi$ increases, are preferably, but not necessarily, piecewise continuous and smooth. A variety of non-symmetrical configurations have been determined to significantly contribute to the desired beam pattern.

Figure 6A:
FIGS. 6A–6G are graphs showing, in enhanced form, one or more extrema deviating from a base curve.
Figure 6B:
Figure 6C:
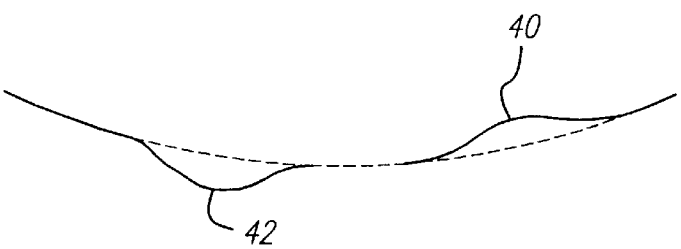
Figure 6D:
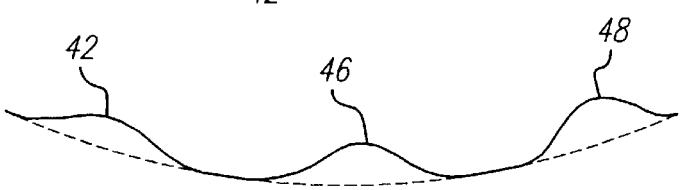
Figure 6E:
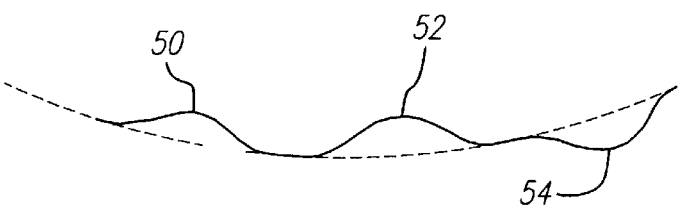
Figure 6F:
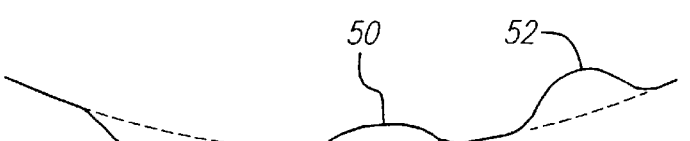
Figure 6G:
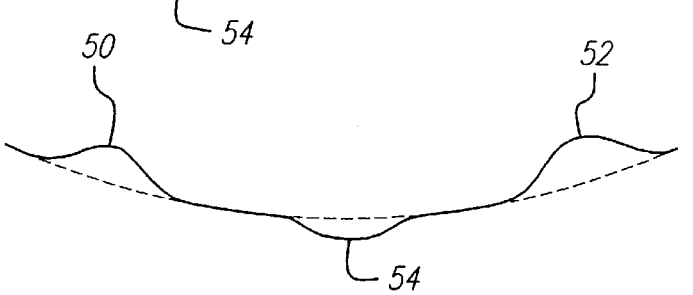

The contemplated cross-sectional curves formed by an intersection of all or part of the second reflective surface 14 with either of an x-y or lateral plane, or additionally or alternatively with an x-z or longitudinal plane, are shown in FIGS. 6A–6G. The generally concave surface 14 can include a convex extrema 30 located between two concave regions 32 and 34 (FIG. 6A). The concave surface may include two generally convex extrema 36 and 38 (FIG. 6B). Alternatively, the concave surface may include a convex extremum 40 adjacent a concave extremum 42 (FIG. 6C). The concave surface may additionally or alternatively include three convex extrema 44, 46 and 48 (FIG. 6D). In addition, the concave surface may include two convex extrema 50 and 52 in various positional relationships with a concave extremum 54 (FIGS. 6E–6G). Although the extrema are shown with respect to a cross-section through the entire reflective surface, it is understood that similar features can be found on a smaller scale. For example, any portion of a lateral or longitudinal cross-sectional curve may include any of the profile curves shown in FIGS. 6A–6G.

Further, as successive slices or cross-sections are taken through the reflective surface 14, the curve shown in FIG. 6A may transition to any of the curves shown in FIGS. 6A–6G. This is best described with respect to FIG. 4B. The curve at z=60 is analogous to the curve shown in FIG. 6A. At successively similar z values, the surface transitions until it forms the curve at z=−60, which is analogous to the curve in FIG. 6B. Similarly, the curves shown in FIG. 5B may transition at successively different y values. This transitioning effect can occur over the entire surface, or over small portions of the surface.

Figure 7:
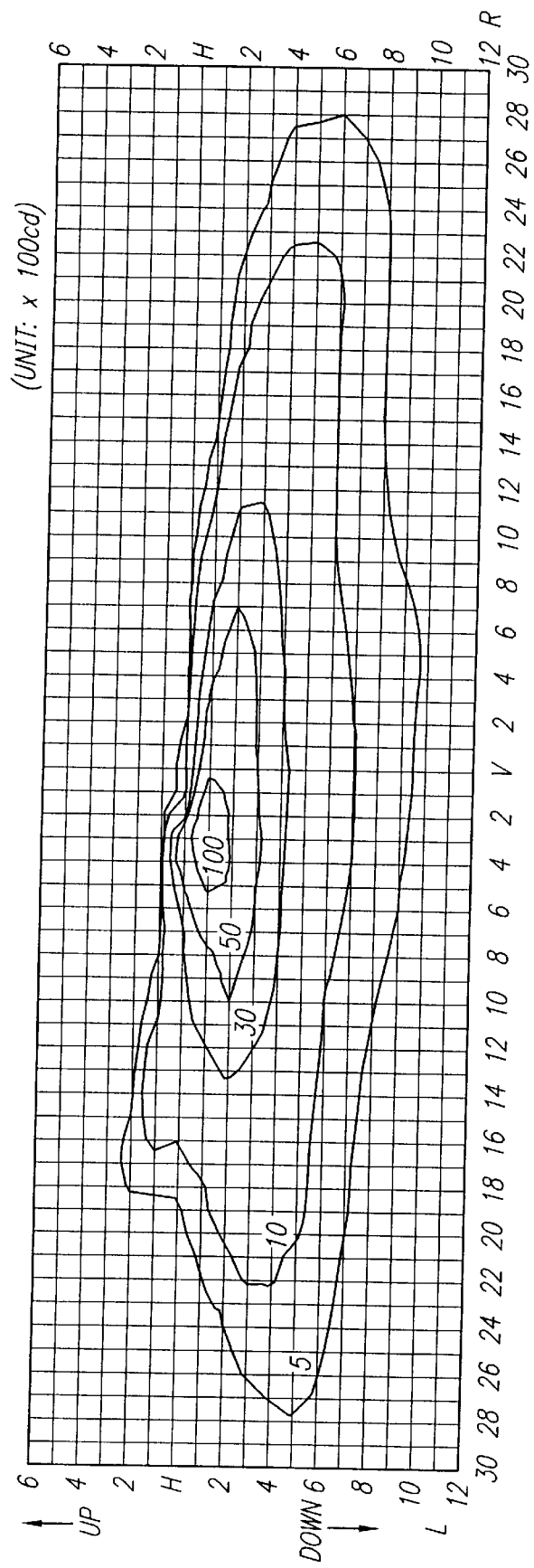
FIG. 7 is a contour plot showing a desired far field low-beam intensity distribution for an automobile headlamp.

The non-symmetrical or irregular shape of the first and/or second reflector should allow the headlamp 10 to achieve a far field beam pattern similar to that shown in FIG. 7, without requiring a prismatic lens over the lamp's aperture 15. Further, the first reflector 12 prohibits light from exiting the aperture in an uncontrolled fashion and consequently serves to control glare.

Due to the disposition of the first reflector 12 between the source (not shown) and the exit aperture 15, the collection efficiency of the light is much increased over what would be possible by using only a single reflector to collect the light.

The geometry of the two reflectors is optimized to provide the desired beam pattern using nonimaging optical design techniques that take into account multiple reflections. For further discussion of the intentional use of multiple reflections in nonimaging optical design techniques, see, U.S. Pat. No. 5,237,170 to N. Shatz titled, "Method and Apparatus for Non-imaging Concentration and Projection of Electromagnetic Radiation."

Although the foregoing discloses the presently preferred embodiments of the invention, it is understood that the those skilled in the art may make various changes to the preferred embodiment shown without departing from the scope of the invention. The invention is defined only by the following claims.

I claim:

1. Apparatus for collecting electromagnetic radiation and projecting the collected electromagnetic radiation into a beam having a predetermined pattern, comprising:

a generally concave reflective surface defining an exit aperture; and a generally convex reflective surface being non-symmetric about an axis normal to the generally convex reflective surface, the generally convex reflective surface intercepting at least a portion of the electromagnetic radiation that is not radiated directly toward the generally concave reflective surface, and reflecting this portion of the radiation toward the generally concave reflective surface, wherein flux of the beam is increased.

2. Apparatus for projecting collected electromagnetic radiation as defined in claim 1, wherein an intersection between the generally convex reflective surface at a location thereon and a plane perpendicular to the said generally convex reflective surface at said location provides a non-symmetric curve.

3. Apparatus for projecting collected electromagnetic radiation as defined in claim 1, wherein the generally convex reflective surface is piecewise continuous.

4. Apparatus for collecting electromagnetic radiation and projecting the collected electromagnetic radiation into a beam having a predetermined pattern, comprising:

a generally concave reflective surface defining an exit aperture; and a generally convex reflective surface being non-symmetric about an axis normal to the generally convex reflective surface, the generally convex reflective surface intercepting at least a portion of the electromagnetic radiation that is not radiated directly toward the generally concave reflective surface, and reflecting this portion of the radiation toward the generally concave reflective surface, wherein flux of the beam is increased and, wherein a curve formed by a longitudinal cross-section of the generally convex reflective surface includes a concave extremum.

5. Apparatus for projecting collected electromagnetic radiation as defined in claim 4, wherein the concave extremum is bounded on each side by convex extrema.

6. Apparatus for projecting collected electromagnetic radiation as defined in claim 5, wherein the distances between the concave extremum and each convex extremum are different.

7. Apparatus for projecting collected electromagnetic radiation as defined in claim 4, wherein said curve includes more than one concave extremum.

8. Apparatus for projecting collected electromagnetic radiation as defined in claim 4, wherein said curve includes a convex extremum.

9. Apparatus for projecting collected electromagnetic radiation as defined in claim 4, wherein said concave extremum is bounded on one side by another concave extremum and bounded on its other side by a convex extremum.

10. Apparatus for collecting electromagnetic radiation and projecting the collected electromagnetic radiation into a beam having a predetermined pattern, comprising:

a generally concave reflective surface defining an exit aperture; and a generally convex reflective surface being non-symmetric about an axis normal to the generally convex reflective surface, the generally convex reflective surface intercepting at least a portion of the electromagnetic radiation that is not radiated directly toward the generally concave reflective surface, and reflecting this portion of the radiation toward the generally concave reflective surface, wherein flux of the beam is increased and, wherein a curve formed by a longitudinal cross-section of the generally convex reflective surface has a convex extremum bounded on each side by concave extrema.

11. Apparatus for projecting collected electromagnetic radiation as defined in claim 10, wherein the distances between the convex extremum and each concave extremum are different.

12. Apparatus for collecting electromagnetic radiation and projecting the collected electromagnetic radiation into a beam having a predetermined pattern, comprising:

a generally concave reflective surface defining an exit aperture; and a generally convex reflective surface being non-symmetric about an axis normal to the generally convex reflective surface, the generally convex reflective surface intercepting at least a portion of the electromagnetic radiation that is not radiated directly toward the generally concave reflective surface, and reflecting this portion of the radiation toward the generally concave reflective surface, wherein flux of the beam is increased and, wherein a curve formed by a lateral cross-section of the generally convex reflective surface includes a concave extremum.

13. Apparatus for projecting collected electromagnetic radiation as defined in claim 12, wherein the concave extremum is bounded on each side by convex extrema.

14. Apparatus for projecting collected electromagnetic radiation as defined in claim 13, wherein the distances between the concave extremum and each convex extremum are different.

15. Apparatus for projecting collected electromagnetic radiation as defined in claim 12, wherein said curve has a convex extremum bounded on each side by concave extrema.

16. Apparatus for projecting collected electromagnetic radiation as defined in claim 15, wherein the distances between the convex extremum and each concave extremum are different.

17. Apparatus for projecting collected electromagnetic radiation as defined in claim 12, wherein said curve includes more than one concave extremum.

18. Apparatus for projecting collected electromagnetic radiation as defined in claim 12, wherein said curve includes a convex extremum.

19. Apparatus for projecting collected electromagnetic radiation as defined in claim 12, wherein said concave extremum is bounded on one side by another concave extremum and bounded on its other side by a convex extremum.

* * * * *